No. 654,169. Patented July 24, 1900.
P. H. MACNEIL.
WHEEL.
(Application filed Mar. 13, 1900.)
(No Model.) 2 Sheets—Sheet 1.
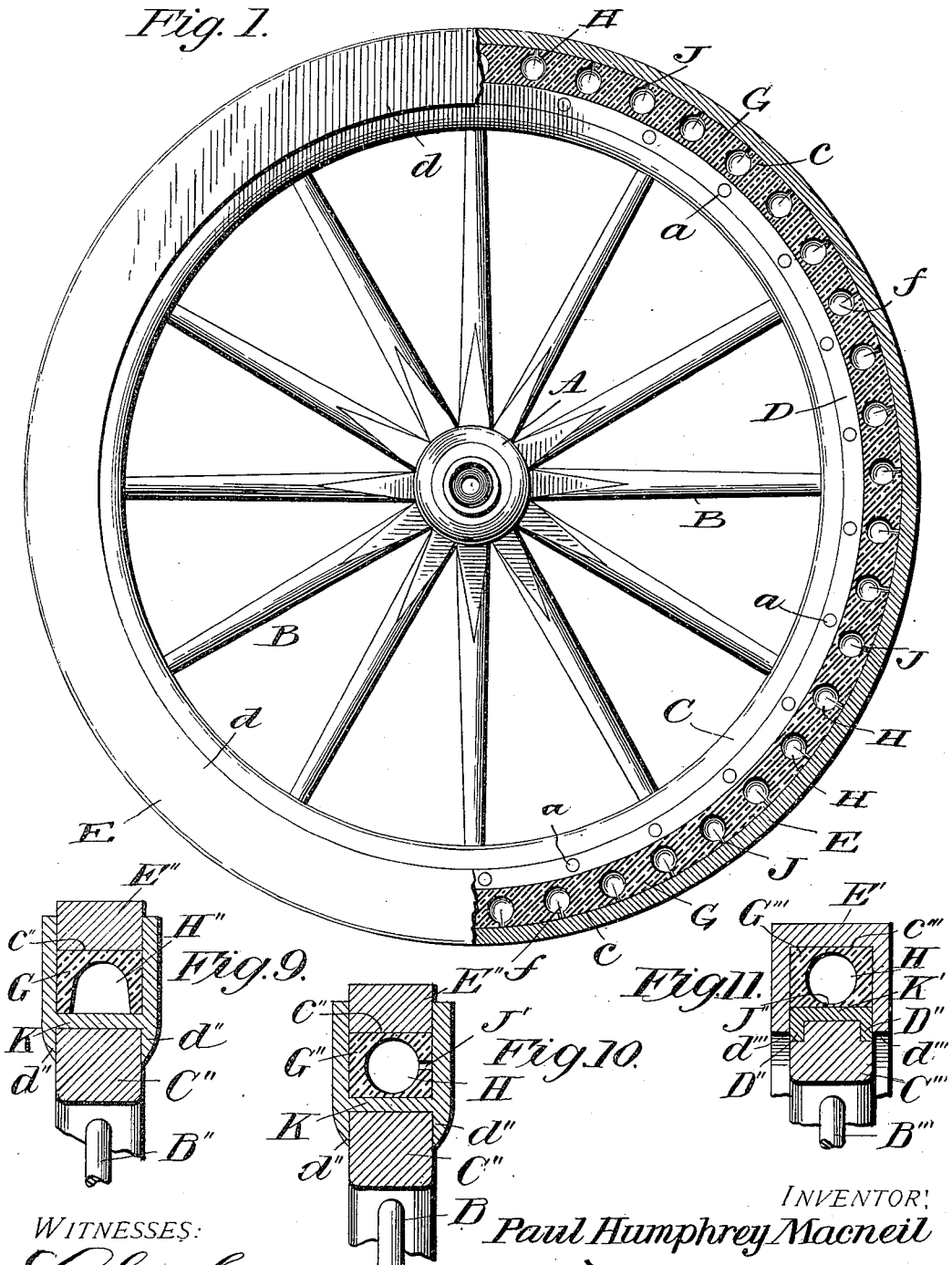
INVENTOR:
Paul Humphrey Macneil
BY M. D. Converse
Attorney
WITNESSES:
L. C. Hills.
Ambrose Macneil No. 654,169. Patented July 24, 1900.
P. H. MACNEIL.
WHEEL.
(Application filed Mar. 13, 1900.)
(No Model.) 2 Sheets—Sheet 2.
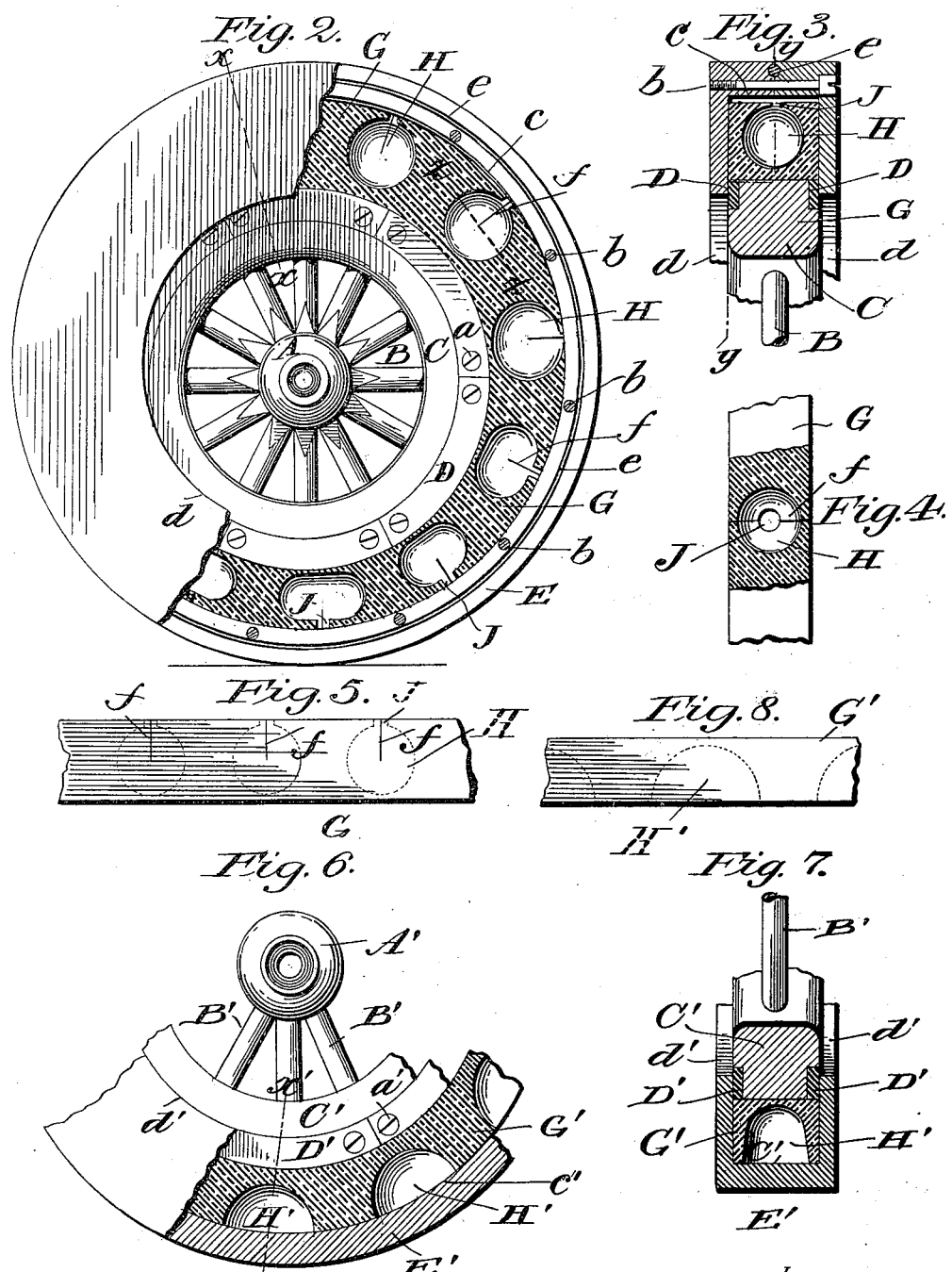

UNITED STATES PATENT OFFICE.

PAUL HUMPHREY MACNEIL, OF WASHINGTON, DISTRICT OF COLUMBIA.

WHEEL.

SPECIFICATION forming part of Letters Patent No. 654,169, dated July 24, 1900.

Application filed March 13, 1900. Serial No. 8,450. (No model.)

*To all whom it may concern:*

Be it known that I, PAUL HUMPHREY MACNEIL, a citizen of the United States, residing at Washington, in the District of Columbia, have invented certain new and useful Improvements in Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My present invention relates to wheels, especially to vehicle-wheels, and more particularly to means for improving the resiliency of the same.

Wheels have been made in which tires or zones between the hub and tread or shoe of the tire have been filled with continuous elastic cushions of solid cross-section or with elastic substances, such as commercial rubber or similar compositions, having continuous tubular air-chambers of approximately-equal interior transverse dimension or in which the interior dimensions of these chambers have been contracted more or less at intervals, forming a succession of connected air-chambers, and these chambers at their apertures of connection in some cases have also been provided with valves. In wheels so made the air-chambers have either been inflated or filled with air and sealed at time of manufacture or are designed to be subsequently filled or inflated by an air-pump.

It is well known that owing to the more or less porous property of all substances commercially employed for making elastic pneumatic zones or tires an inflated or air-filled cavity in the same under pressures incident to use soon loses the air volume, so that wheels having air-chambers so made and operating as above are always liable to and actually do lose resiliency in consequence of loss of air volume, entailing delays for replacement of the same by repair or by the application of an air-pump. In other cases wheels of the general class to which my invention is related have been made with elastic or flexible air pockets, balls, or cavities of various construction inclosed in every case in flexible or elastic outer tubes, covers, or casings, some thereof adapted so that the air is discharged from the pockets, balls, or cavities, one at a time only, to the open atmosphere and refilled, one at a time only, therefrom, and only when each air pocket, ball, or cavity is coincident or approximately coincident to the immediate point of the flexible or elastic tire or cover that at the instant is in contact with the ground, some thereof adapted so as to confine and compress the air in the pockets, balls, or cavities, one at a time only, and only when each air pocket, ball, or cavity (or transverse row of same) is coincident or approximately coincident to the immediate point of the flexible or elastic tire that at the instant is in contact with the ground, and some thereof adapted so as to discharge a little of the air at a time from the pockets, balls, or cavities, one at a time only, to the inflating volume within elastic or flexible tubular tires of ordinary type and refill therefrom and only when each air pocket, ball, or cavity (or transverse row of same) is coincident or approximately coincident to the immediate point of the flexible or elastic tire that at the instant is in contact with the ground. In all of these the devices, construction, and arrangement are such that substantially but one of the air pockets, balls, or cavities (or one transverse row of the same) is operative at any given time to useful effect, which I find to be a disadvantage in many cases.

The objects of my invention are to overcome these difficulties, to provide a resilient zone or tire for wheels in which the air-cells without the application of air-pumps will not singly but collectively semicircumferentially of the wheel automatically successively fill with air and confine and compress the same therein throughout the resistance side of its circumference as the wheel rolls on its tread under the weight of the vehicle or under the weight of the same and a load, and to improve the efficiency, increase the durability, and simplify the construction of resilient wheels.

To these ends my invention consists, essentially, in the interposition in a zone of the wheel of an elastic member or members, of rubber or other suitable material, preferably made of rectangular form in transverse section, having provided within and longitudinally its body in a successional order a plurality of separated unconnected air pockets or cells, each of which is provided with an aperture through the wall or with an open side, preferably on the outer radial side, and particularly in inclosing this member in a housing or in a channeled metallic or other inflexible or non-elastic zone member or members and securing these parts to the felly of the wheel in such a manner that the said non-elastic shoe or tire may be free to vibrate diametrically of the wheel to the full limit of the elasticity of the elastic member and the imprisoned and compressed air in its cells, whereby the cells may not singly but a plurality of them will collectively semicircumferentially of the wheel automatically be filled with air and the same compressed therein collectively semicircumferentially of the wheel by the rolling of the wheel upon the ground under load, constituting an autopneumatic device; and, further, it consists in the several devices, arrangement, and combinations of parts hereinafter fully set forth and claimed.

In the drawings, Figure 1 is a full side elevation of a wheel, partly sectional, with my invention incorporated, showing its construction in part. Fig. 2 is a dwarfed wheel with rim of exaggerated proportions, partly sectional, showing, further, the construction and application and illustrating the operation of my invention, the section being on line $y\,y$ of Fig. 3 through the elastic member only, with one-half of the metallic shoe removed. Fig. 3 is a transverse section of the rim of the wheel on line $x\,x$ of Fig. 2, further showing the construction and application of my invention. Fig. 4 is a longitudinal sectional view of the elastic member, taken through one of its air-cells, on line $z\,z$ of Fig. 2. Fig. 5 is a side elevation of a fragment of the elastic member straightened out, with its air-cells and their apertures shown in dotted lines. Fig. 6 is a side elevation, partly sectional, of a segmental part of the wheel, illustrating a modified construction and application of my invention, the section being taken on line $y'\,y'$ of Fig. 7. Fig. 7 is a cross-section of the rim of the wheel in this modified form, taken on line $x'\,x'$ of Fig. 6. Fig. 8 is a fragment of the elastic member as employed in this modification straightened out, with air-cells (more opened on the outer radial side) shown in dotted lines; and Figs. 9, 10, and 11 illustrate further modifications in applying my invention, all of which will hereinafter be more fully described in detail.

Like letters indicate corresponding parts throughout the figures.

A and A' represent the hub, B, B', B'', and B''' the spokes, and C, C', C'', and C''' the felly, of a wheel.

D D, D' D', and D'' D'' are wearing-plates, each of which may be made in one piece or in segmental parts, secured to the lateral opposite sides of the felly by rivets $a\,a'$ or otherwise and may or may not cover the entire surface of the latter.

E, E', and E'' represent a metallic or other inflexible non-elastic internally-channeled shoe or tire, which may be divided longitudinally, as or similarly to that shown in Fig. 3, and united by bolts $b\,b$ or may be made solid or in one piece, as in Figs. 1, 7, and 11, and may also be made in segmental parts, if desirable. If divided, as shown in Fig. 3, a groove may be cut or formed longitudinally the face of the halves and a strip or cord of suitable packing material laid in the same to insure an airtight jointure. This shoe or tire is of [ form in transverse section, the channel being (in this figure) on the interior, opposite the tread, and preferably continuous longitudinally and preferably of the rectilineal form described. In the modifications of my invention shown by Figs. 9 and 10 the tire or shoe is not channeled.

G, G', G'', and G''' represent an elastic member (which I prefer to make in one strip of rectangular cross-section, but which may be made in segmental parts) provided with a succession of separated or permanently-disconnected air-cells H, H', H'', and H''', which may be of many forms suitable, but which I prefer to make like those shown. I prefer to arrange these air-cells at regular intervals of space. J in Figs. 1, 2, 3, and 5, J' in Fig. 10, and J'' in Fig. 11 are apertures or openings from the interior of each of the air-cells through preferably but one wall of each and preferably through the wall on the extreme outer side next the inner side of the tread at $c\,c'\,c''\,c'''$ of the metallic shoe E, E', and E''. The elastic member may in some cases be cut partially through transversely the air-cells thereof, as indicated by a fine line at $f$ in Figs. 1, 2, 3, and 5. This device will also facilitate removal of the member from its matrix when manufactured. In Figs. 9 and 11 the apertures from the air-cells are shown to be in the side of the member next to the felly and in Fig. 10 in the lateral side.

In the modified form of the elastic member shown by Figs. 6, 7, 8, and 9 these cells are more widely opened next the inner side of the tread $c'$ of the metallic shoe or on the side next the felly, as in Fig. 9. In all cases, however, the elastic member G, G', G'', and G''' is closely housed or confined within the channel of the metallic or inflexible non-elastic shoe with its innermost side resting firmly and continuously upon the periphery of the felly or felly-band, as in Figs. 1, 2, 3, 6, and 7, or housed within the channel of the felly-band K, which in such case is inflexible or non-elastic and retained in position by the tire E'', also inflexible or non-elastic, as in Figs. 9 and 10, in which position it is maintained by the extended edges of the lateral parallel flanges $d\,d$ and $d'\,d'$ of the shoe which overhang the felly circumferentially and bear against the wearing-plates D, D', and D" laterally, as in Figs. 1, 2, 3, 6, 7, and 11, or by the extended corners of the felly-band at d" d", as in Figs. 9 and 10, but may be held by other means.

The operation of my invention is as follows: Referring to Fig. 2, which illustrates in an exaggerated manner the positions assumed by the various parts when the wheel is under a load, and assuming the wheel to roll from the left to the right hand, it will be seen that a considerable number (about one-half of all) of the apertures or (as it would be in the case of modifications of same) the opening or opened sides of the air-cells collectively and successively, commencing at about half the height of the wheel on the front side, are closed all around on the semicircumferential or lower half of the wheel and the air therein closely imprisoned by the pressing or meshing of the inflexible shoe against the extreme outer sides and margins of the elastic member and that the air therein consequently is compressed in each cell successively more and more as each passes nearer and nearer to and under the axis of the wheel, while at the same time cells opposite, beginning at the rear side of the wheel, it will be understood, are successively released and (if the load is sufficient) incline to draw away more and more or expand radially as they approach the top of the wheel, whereby fresh air is automatically drawn in between the lateral sides of the elastic member and the inner housing-flanges of the metallic or inflexible confining members over the margins of the elastic member through the open sides or apertures into the cells to replace any loss of air volume and to be in like manner imprisoned and compressed as the wheel rolls on. Like results would follow in the case of the modifications shown.

Those skilled in the art will clearly understand that my invention may be applied in wheels for use on all classes of conveyances and is particularly desirable in wheels on vehicles for heavy service, whether drawn or motor-driven, and it will also be seen that the durability of the resilient quality of wheels constructed with my improvements incorporated is greatly enhanced.

I do not wish to limit myself to the precise construction of the parts forming the means for housing the elastic member and properly confining it in operable position, as it is apparent that a number of modifications might be made in these respects other than those herein shown and described. In Fig. 11 I have shown the felly of the wheel bound by a holding-band K', (which might be of the form of a common inflexible metallic tire,) with flanges D" D" very similar to the shoe E and E', but small enough in transverse dimensions to enter freely the interior or channel of the inflexible shoe. In Figs. 9 and 10 I have shown the elastic member-carrying channel in the felly band or tire instead of connected in the shoe, the open side of the channel here being outward radially, and have shown here the elastic member radially held by a tire partially entering the channel circumferentially.

Having described my invention, what I claim as new, and desire to secure by Letters Patent, is—

1. In a wheel a confined elastic zone member, having a plurality of disconnected air-cells within and longitudinally of its body each provided with an opening in one of the walls thereof, in combination with an inflexible non-elastic confining outer member.

2. In a wheel an elastic zone member, having a plurality of disconnected air-cells within and longitudinally of its body each provided with an opening in one of the walls thereof, the whole inclosed on all sides closely by inflexible non-elastic housing members.

3. In a wheel an elastic zone member, having a plurality of disconnected air-cells within and longitudinally of its body each having an opening in one of the walls thereof, inclosed by the felly on one side and by an inflexible non-elastic-tire shoe on the opposite or tread side and by the inflexible non-elastic flanges of the latter on the lateral sides.

4. In a wheel an elastic zone member, having a plurality of disconnected air-cells within and longitudinally of its body each having an opening in one of the walls thereof, inclosed by the felly-band on one side and by an inflexible non-elastic-tire shoe on the opposite or tread side and by the inflexible non-elastic flanges of the latter on the lateral sides.

5. In a wheel an elastic zone member, having a plurality of disconnected air-cells within and longitudinally of its body each having an opening in one of the walls thereof, inclosed by an inflexible non-elastic channeled felly band or tire on the felly side, by an inflexible non-elastic shoe or tire on the outer or radial side and by the inflexible non-elastic flanges of the felly-band on the lateral sides.

6. In a wheel an elastic zone member, having a plurality of disconnected air-cells within and longitudinally of its body, said cells having an opening in one of the walls or sides thereof, inclosed by a non-elastic member or felly on the felly side and by a two-part channeled shoe or tire on the opposite or tread side, said two-part shoe, having flanges to inclose said elastic member on the lateral sides and provided with a groove in each half with suitable packing material inserted therein, held in place by bolts.

In testimony whereof I affix my signature in presence of two witnesses.

PAUL HUMPHREY MACNEIL.

Witnesses:
WILLIAM D. SULLIVAN,
WILLIAM A. FAULKNER.